United States Patent
Okitsu et al.

(10) Patent No.: US 8,427,094 B2
(45) Date of Patent: Apr. 23, 2013

(54) METHOD FOR CONTROLLING POSITIONING OF ACTUATOR COMPRISING WAVE GEAR DEVICE

(75) Inventors: Yoshifumi Okitsu, Azumino (JP); Yuki Kato, Azumino (JP); Kozo Sasaki, Azumino (JP); Makoto Iwasaki, Nagoya (JP)

(73) Assignees: Harmonic Drive Systems, Inc., Tokyo (JP); National University Corporation Nagoya Institute of Technology, Aichi (JP)

( * ) Notice: Subject to any disclaimer, the term of this patent is extended or adjusted under 35 U.S.C. 154(b) by 181 days.

(21) Appl. No.: 13/080,756

(22) Filed: Apr. 6, 2011

(65) Prior Publication Data

US 2011/0248661 A1    Oct. 13, 2011

(30) Foreign Application Priority Data

Apr. 9, 2010 (JP) .................................. 2010-090695

(51) Int. Cl.
  *G05D 23/275* (2006.01)
(52) U.S. Cl.
  USPC ....... 318/632; 318/568.22; 318/560; 318/626
(58) Field of Classification Search .................. 318/632, 318/560, 568.22, 615, 616, 617, 620, 626
  See application file for complete search history.

(56) References Cited

U.S. PATENT DOCUMENTS

| | | | | |
|---|---|---|---|---|
| 5,049,797 A | * | 9/1991 | Phillips | 318/568.16 |
| 5,327,061 A | * | 7/1994 | Gullapalli | 318/649 |
| 5,442,270 A | * | 8/1995 | Tetsuaki | 318/568.22 |
| 5,910,720 A | * | 6/1999 | Williamson et al. | 318/623 |
| 8,013,560 B2 | * | 9/2011 | Sasaki et al. | 318/632 |

OTHER PUBLICATIONS

Ishijima et al., "Non-Linear System Theory" Society of Instrument and Control Engineers, Corona Publishing Co., Ltd., (1993), pp. 141-168.

* cited by examiner

*Primary Examiner* — Walter Benson
*Assistant Examiner* — Thai Dinh
(74) *Attorney, Agent, or Firm* — Buchanan Ingersoll & Rooney PC

(57) ABSTRACT

A method for controlling positioning of an actuator having a wave gear device uses an exact linearization technique to compensate effects relative to positioning control of a load shaft caused by the non-linear spring characteristics of the wave gear device. A plant model is constructed from the actuator, and linearized using the exact linearization technique; measurements are taken of non-linear elastic deformation of the wave gear device relative to load torque; the non-linear spring model $\tau g(\theta tw)$ is defined using a cubic polynomial with the constant defined as zero to allow the measurement results to be recreated; and the current input into the model and motor position of the model when a load acceleration command is a command value are entered into a processor arranged as a semi-closed loop control system for controlling positioning of the load shaft, as a feed-forward current command and a feed-forward motor position command.

1 Claim, 8 Drawing Sheets

FIG. 1
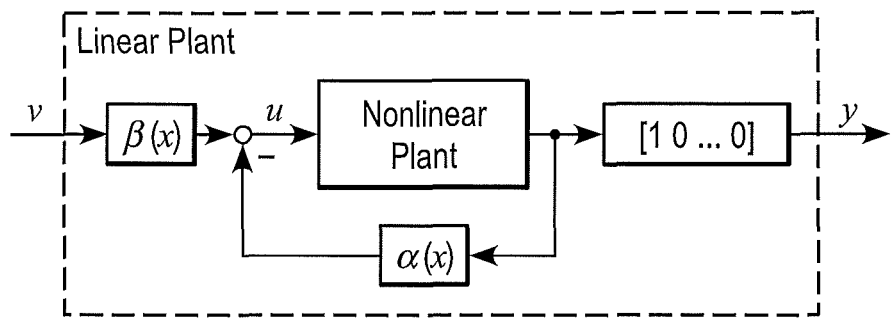
BLOCK LINE DIAGRAM OF STRICT LINEARIZATION TECHNIQUE
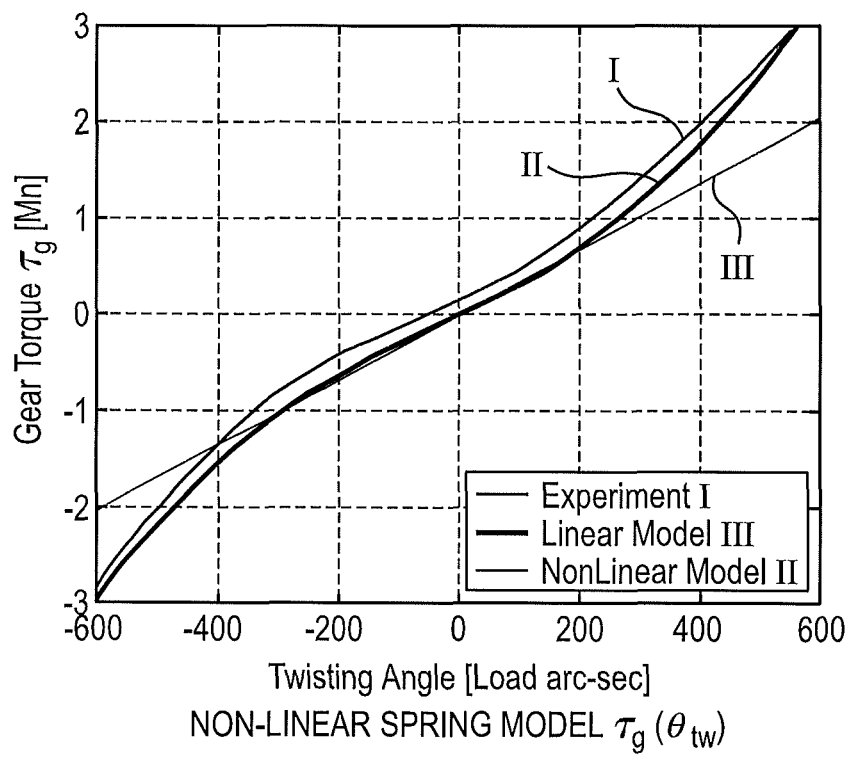
NON-LINEAR SPRING MODEL $\tau_g(\theta_{tw})$
FIG. 2

CONVENTIONAL METHOD

LOAD POSITION

PRESENT INVENTION

LOAD POSITION

CONVENTIONAL METHOD

MOTOR POSITION

PRESENT INVENTION

MOTOR POSITION

LOAD ACCELERATION

LOAD ACCELERATION

CONVENTIONAL METHOD

CURRENT COMMAND

PRESENT INVENTION

CURRENT COMMAND

METHOD FOR CONTROLLING POSITIONING OF ACTUATOR COMPRISING WAVE GEAR DEVICE

BACKGROUND OF THE INVENTION

1. Field of the Invention

The present invention relates to a method for controlling positioning of an actuator for reducing the rotational output of a motor via a wave gear device and providing output from a load shaft. More specifically, the present invention relates to a positioning control method of an actuator that is equipped with a wave gear device that makes it possible to use an exact linearization technique to inhibit any reduction in the accuracy with which positioning of the load shaft is controlled, as caused by the non-linear spring characteristics of the wave gear device.

2. Description of the Related Art

There is known in the art an actuator 1 in which a wave gear device 3 is employed as a drive for outputting a decelerated rotational output of a motor 2, as shown in FIG. 9. A controller 4 known in the art for controlling positioning of the actuator 1 of the above configuration performs a semi-closed loop control wherein the rotational position and rotational speed of a motor shaft 5 are detected by a sensor 6 attached to the motor shaft 5; and the rotation of the load shaft 7, which is the drive output shaft, is controlled based on the sensor readings. The characteristics of the wave gear device 3 greatly influence the positioning control characteristics of the load shaft 7 in such semi-closed loop control systems because driving of the motor 2 is not controlled by directly detecting rotational information relating to the load shaft 7.

Non-linear elastic deformation occurs between the input and output in the wave gear device when a load torque is applied, and is one factor preventing the load shaft from being controlled with a high degree of accuracy. The effects of the non-linear spring characteristic must be accounted for in order to achieve high-accuracy control of the load shaft.

Exact linearization of the input-output relationship is known as a control method for controlling non-linear elements. Exact linearization is a technique wherein a linearization feedback $\alpha(x)$ and an input conversion $\beta(x)$ are performed as shown in FIG. 1, and linearization is accomplished by setting $\alpha(x)$ and $\beta(x)$ so that the characteristics of the output y will be $d^n y/dt^n = v$ from the input v of the expansion system, which includes $\alpha(x)$ and $\beta(x)$ (Non-Patent Reference 1).

[Non-Patent Reference 1] "Non-Linear System Theory", Ishijima et al., Society of Instrument and Control Engineers, CORONA PUBLISHING CO., LTD., p. 141-168, 1993.

SUMMARY OF THE INVENTION

An object of the present invention is to use, in a processor arranged as a semi-closed loop system of an actuator for reducing the rotational output of a motor via a wave gear device and providing output from a load shaft, an exact linearization technique to make it possible to inhibit any reduction in the accuracy with which positioning of the load shaft is controlled, as caused by the non-linear spring characteristics of a wave gear device for which definite analysis and control techniques are not established.

To accomplish the above object, according to the present invention, there is provided a method for controlling, via a processor, positioning of an actuator comprising reducing a rotational output of a motor via a wave gear device and transmitting the output from a load shaft, and controlling positioning of the load shaft based on a rotational position and speed of a motor shaft of the motor, the processor being arranged to:

perform non-linear spring compensation for inhibiting a reduction in the accuracy with which positioning of the load shaft is controlled, as caused by non-linear elastic deformation in relation to a load torque of the wave gear device; and in the non-linear spring compensation, construct a plant model that has been linearized using an exact linearization technique from the actuator to be controlled, and define the linearization feedback $\alpha(x)$ and input conversion $\beta(x)$ as well as the characteristics of the expansion system from input v to output y according to formulae (A), (B), and (C), respectively;

[FORMULA A]

$$\alpha(x) \cdot x = -\frac{J_m J_l N}{D_g K_t} \left\{ \frac{1}{J_l} \frac{d}{dt} \tau_g(\theta_{tw}) - \left( \frac{D_l + D_g}{J_l^2} + \frac{D_g}{J_m J_l N^2} \right) \tau_g(\theta_{tw}) + \left( \frac{(D_l + D_g)^2}{J_l^2} + \frac{D_g^2}{J_m J_l N^2} \right) \omega_l - \left( \frac{D_l D_g + D_g^2}{J_l^2 N} + \frac{D_m D_g N^2 + D_g^2}{J_m J_l N^3} \right) \omega_m \right\} \quad (A)$$

[FORMULA B]

$$\beta(x) \cdot v = \frac{J_m J_l N}{D_g K_t} v \quad (B)$$

[FORMULA C]

$$\frac{d^3 y}{dt^3} = v \quad (C)$$

measure the non-linear elastic deformation in relation to the load torque of the wave gear device;

define the non-linear spring model $\tau_g(\theta_{tw})$ using a cubic polynomial as shown in formula (D), with the constant defined as zero, to be able to recreate the measurement results; and

[FORMULA D]

$$\tau_g(\theta_{tw}) = K_{g3}\theta_{tw}^3 + K_{g2}\theta_{tw}^2 + K_{g1}\theta_{tw} \quad (D)$$

respectively input into a semi-closed loop control system for controlling the positioning of the load shaft, as a feed-forward current command and a feed-forward motor position command, the current input into the plant model and the motor position of the plant model when a load acceleration command is a command value.

EFFECTS OF THE INVENTION

According to the present invention, a feed-forward non-linear spring compensation system based on an exact linearization technique in relation to the non-linear spring characteristics between the input and output shafts of a wave gear device of an actuator is constructed as a non-linear spring characteristic compensation method in the wave gear device. Over shooting of the load shaft is thereby reduced, and the load shaft can be smoothly and accurately stabilized at the target position.

BRIEF DESCRIPTION OF THE DRAWINGS

FIG. 1 is a block schematic diagram depicting an exact linearization technique;

FIG. 2 is a graph depicting a non-linear spring model;

DESCRIPTION OF THE PREFERRED EMBODIMENTS

1. Exact Linearization Technique (1.1 Description of the Formulae)

An exact linearization technique is one in which the object to be controlled is linearized by deriving a linearization feedback $\alpha(x)$ and an input conversion $\beta(x)$ based on a physical equation comprising a non-linear function. The meanings of the symbols in each of the formulae below are as follows.

(Key)
$\theta_m$: motor position
$\theta_l$: load position
$\omega_m$: motor speed
$\omega_l$: load speed
x: state quantity
$x = [\theta_m \; \theta_l \; \omega_m \; \omega_l]$
$\alpha(x)$: linearization feedback
$\beta(x)$: input conversion
u: input (of the state formula)
i: electrical current $$\theta_{tw} = \frac{\theta_m}{N} - \theta_l$$

Figure 9:
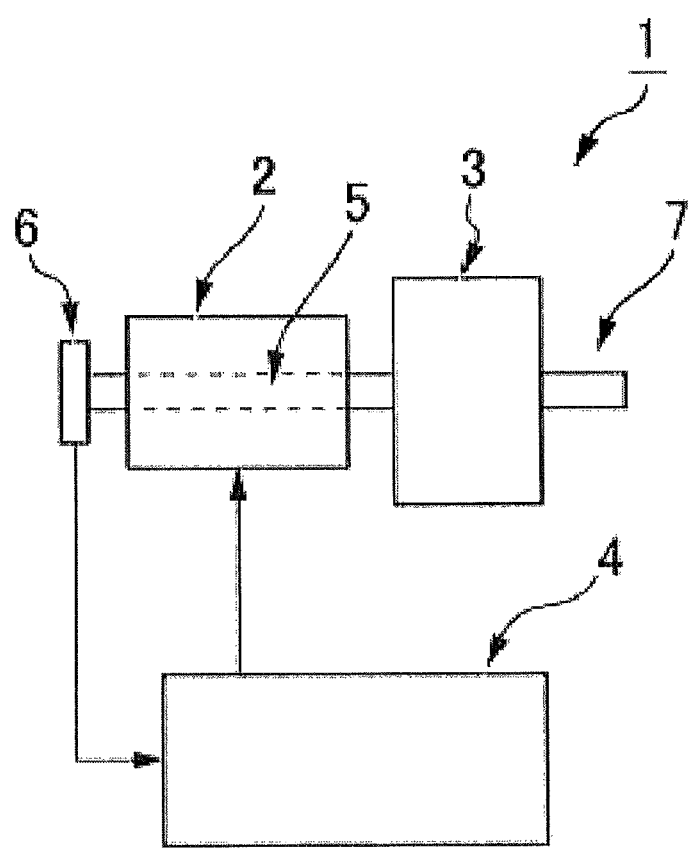
FIG. 9 is a schematic block diagram depicting an actuator comprising a wave gear device to be controlled by the present invention.

$\tau_g(\theta_{tw})$: nonlinear spring model
N: reduction ratio
$K_t$: torque constant
$J_m$: motor inertia
$J_l$: load inertia
$D_m$: motor viscosity coefficient of friction
$D_l$: load viscosity coefficient of friction
$K_g$: spring constant
$D_g$: spring viscosity coefficient of friction
$K_{g3}$, $K_{g2}$, $K_{g1}$: non-linear spring model coefficient
v: input of expansion system
y: output of expansion system
$i^*_{ref}$: FF current command
$\theta^*_m$: FF motor position command
$\theta^*_l$: increase acceleration command First, the characteristics of the object to be controlled are expressed using a non-linear differential equation. The global characteristics of an actuator 1 to be controlled, depicted in FIG. 9, are expressed in a two-inertia model where twisting occurs between the input and output shafts of a wave gear device. The state equation of the two-inertia model expressing the wave gear device becomes formula (1) when the input u is set equal to the current i and the state quantity x is set equal to load position $\theta_l$, load speed $\omega_l$, motor position $\theta_m$, and motor speed $\omega_m$. Formula (2) is obtained when the right side of formula (1) is expanded.

[FORMULA 1]

$$\frac{d}{dt}\begin{bmatrix} \theta_l \\ \omega_l \\ \theta_m \\ \omega_m \end{bmatrix} = \begin{bmatrix} 0 & 1 & 0 & 0 \\ -\frac{K_g}{J_l} & -\frac{D_l+D_g}{J_l} & \frac{K_g}{J_l N} & \frac{D_g}{J_l N} \\ 0 & 0 & 0 & 1 \\ \frac{K_g}{J_m N} & \frac{D_g}{J_m N} & -\frac{K_g}{J_m N^2} & -\frac{D_m N^2 + D_g}{J_m N^2} \end{bmatrix} \begin{bmatrix} \theta_l \\ \omega_l \\ \theta_m \\ \omega_m \end{bmatrix} + \begin{bmatrix} 0 \\ 0 \\ 0 \\ \frac{K_t}{J_m} \end{bmatrix} i \quad (1)$$

[FORMULA 2]

$$\frac{d}{dt}\begin{bmatrix} \theta_l \\ \omega_l \\ \theta_m \\ \omega_m \end{bmatrix} = \begin{bmatrix} \omega_l \\ \frac{K_g}{J_l}\left(\frac{\theta_m}{N} - \theta_l\right) - \frac{D_l+D_g}{J_l}\omega_l + \frac{D_g}{J_l N}\omega_m \\ \omega_m \\ -\frac{K_g}{J_m N}\left(\frac{\theta_m}{N} - \theta_l\right) + \frac{D_g}{J_m N}\omega_l - \frac{D_m N^2 + D_g}{J_m N^2}\omega_m \end{bmatrix} + \begin{bmatrix} 0 \\ 0 \\ 0 \\ \frac{K_t}{J_m} i \end{bmatrix} \quad (2)$$

According to the present invention, the linear spring model $K_g(\theta_m/N - \theta_l)$ is expressed in a first-order non-linear differential equation, shown in formula (3), by substitution with a non-linear spring model $\tau_g(\theta_{tw})$ wherein spring torque varies according to the twisting $\theta_{tw} = \theta_m/N - \theta_l$.

[FORMULA 3]

$$\begin{cases} \dfrac{d\theta_l}{dt} = \omega_l \\ \dfrac{d\omega_l}{dt} = \dfrac{1}{J_l}\tau_g(\theta_{tw}) - \dfrac{D_l+D_g}{J_l}\omega_l + \dfrac{D_g}{J_l N}\omega_m \\ \dfrac{d\theta_m}{dt} = \omega_m \\ \dfrac{d\omega_m}{dt} = -\dfrac{1}{J_m N}\tau_g(\theta_{tw}) + \dfrac{D_g}{J_m N}\omega_l - \dfrac{D_m N^2 + D_g}{J_m N^2}\omega_m + \dfrac{K_t}{J_m}i \end{cases} \quad (3)$$

The load position $\theta_l$, which is the final control amount, is then expanded from formula (3) while derived one order at a time. The first derivative $d\theta_l/dt$, second derivative $d^2\theta_l/dt^2$, and third derivative $d^3\theta_l/dt^3$ of $\theta_l$ become formulas (4), (5), and (6), respectively; and the current i, which is the control input, appears in the formula at the third derivative.

[FORMULA 4]

$$\frac{d\theta_l}{dt} = \omega_l \quad (4)$$

[FORMULA 5]

$$\frac{d^2\theta_l}{dt^2} = \frac{d}{dt}\frac{d\theta_l}{dt} \quad (5)$$
$$= \frac{d\omega_l}{dt}$$
$$= \frac{1}{J_l}\tau_g(\theta_{tw}) - \frac{D_l+D_g}{J_l}\omega_l + \frac{D_g}{J_l N}\omega_m$$

[FORMULA 6]

$$\frac{d^3\theta_l}{dt^3} = \frac{d}{dt}\frac{d^2\theta_l}{dt^2} \quad (6)$$
$$= \frac{d}{dt}\frac{1}{J_l}\tau_g(\theta_{tw}) - \frac{d}{dt}\frac{D_l+D_g}{J_l}\omega_l + \frac{d}{dt}\frac{D_g}{J_l N}\omega_m$$
$$= \frac{1}{J_l}\frac{d}{dt}\tau_g(\theta_{tw}) - \frac{D_l+D_g}{J_l}\frac{d\omega_l}{dt} + \frac{D_g}{J_l N}\frac{d\omega_m}{dt}$$
$$= \frac{1}{J_l}\frac{d}{dt}\tau_g(\theta_{tw}) - \frac{D_l+D_g}{J_l}$$
$$\left(\frac{1}{J_l}\tau_g(\theta_{tw}) - \frac{D_l+D_g}{J_l}\omega_l + \frac{D_g}{J_l N}\omega_m\right) +$$
$$\frac{D_g}{J_l N}\left(-\frac{1}{J_m N}\tau_g(\theta_{tw}) + \frac{D_g}{J_m N}\omega_l - \frac{D_m N^2 + D_g}{J_m N^2}\omega_m + \frac{K_t}{J_m}i\right)$$
$$= \frac{1}{J_l}\frac{d}{dt}\tau_g(\theta_{tw}) - \left(\frac{D_l+D_g}{J_l^2} + \frac{D_g}{J_m J_l N^2}\right)\tau_g(\theta_{tw}) +$$
$$\left(\frac{(D_l+D_g)^2}{J_l^2} + \frac{D_g^2}{J_m J_l N^2}\right)\omega_l -$$
$$\left(\frac{D_l D_g + D_g^2}{J_l^2 N} + \frac{D_m D_g N^2 + D_g^2}{J_m J_l N^3}\right)\omega_m + \frac{D_g K_t}{J_m J_l N}i$$

While the load position θl in relation to any input i can be obtained by solving formula (6), formula (6) is a third-order non-linear differential equation, and obtaining a generalized solution is difficult. The electrical current i is calculated from formula (6) as formula (7) using input v and state quantities θl, ωl, θm, and ωm of the expanded system. From formula (7), the linearization feedback α(x) and input conversion β(x) become as shown in formulae (8) and (9) respectively. In this case, the characteristics of the expansion system from the input v to output y become as shown in formula (10).

[FORMULA 7]

$$i = -\frac{J_m J_l N}{D_g K_t}\left\{\frac{1}{J_l}\frac{d}{dt}\tau_g(\theta_{tw}) - \right. \quad (7)$$
$$\left(\frac{D_l+D_g}{J_l^2} + \frac{D_g}{J_m J_l N^2}\right)\tau_g(\theta_{tw}) + \left(\frac{(D_l+D_g)^2}{J_l^2} + \frac{D_g^2}{J_m J_l N^2}\right)\omega_l -$$
$$\left.\left(\frac{D_l D_g + D_g^2}{J_l^2 N} + \frac{D_m D_g N^2 + D_g^2}{J_m J_l N^3}\right)\omega_m\right\} + \frac{J_m J_l N}{D_g K_t}v$$

[FORMULA 8]

$$\alpha(x)\cdot x = -\frac{J_m J_l N}{D_g K_t}\left\{\frac{1}{J_l}\frac{d}{dt}\tau_g(\theta_{tw}) - \right. \quad (8)$$
$$\left(\frac{D_l+D_g}{J_l^2} + \frac{D_g}{J_m J_l N^2}\right)\tau_g(\theta_{tw}) + \left(\frac{(D_l+D_g)^2}{J_l^2} + \frac{D_g^2}{J_m J_l N^2}\right)\omega_l -$$
$$\left.\left(\frac{D_l D_g + D_g^2}{J_l^2 N} + \frac{D_m D_g N^2 + D_g^2}{J_m J_l N^3}\right)\omega_m\right\}$$

[FORMULA 9]

$$\beta(x)\cdot v = \frac{J_m J_l N}{D_g K_t}v \quad (9)$$

[FORMULA 10]

$$\frac{d^3 y}{dt^3} = v \quad (10)$$

(1.2 Non-Linear Spring Model)

It follows from Eq. (8) that the non-linear spring model τg(θtw) and its first-order derivative dτg(θtw)/dt are needed for non-linear spring compensation; therefore, τg(θtw) must have a first-order derivative. Accordingly, in the present invention, the spring characteristics measured for the device as shown by line I in FIG. 2 are expressed by a third-order polynomial shown in formula (11), in which the constant term is set to zero, as a non-linear spring model τg(θtw); and these characteristics are shown by line II in FIG. 2. It follows from FIG. 2 that the spring characteristics measured for the device can be more accurately reproduced than with the linear spring shown by line III, despite hysteresis characteristics not being accounted for in the constructed non-linear spring model.

[FORMULA 11]

$$\tau_g(\theta_{tw}) = K_{g3}\theta_{tw}^3 + K_{g2}\theta_{tw}^2 + K_{g1}\theta_{tw} \quad (11)$$

2. FF Non-Linear Spring Compensation

The linearization feedback α(x) and the input conversion β(x) are derived from formulae (8) and (9), as described above. As can be seen in formula (8), however, the load position θl and load speed ωl are required for the linearization feedback α(x). The control system of the actuator to be controlled according to the present invention is a processor arranged as a semi-closed loop control system, and data on the load shaft cannot be obtained.

Figure 3:
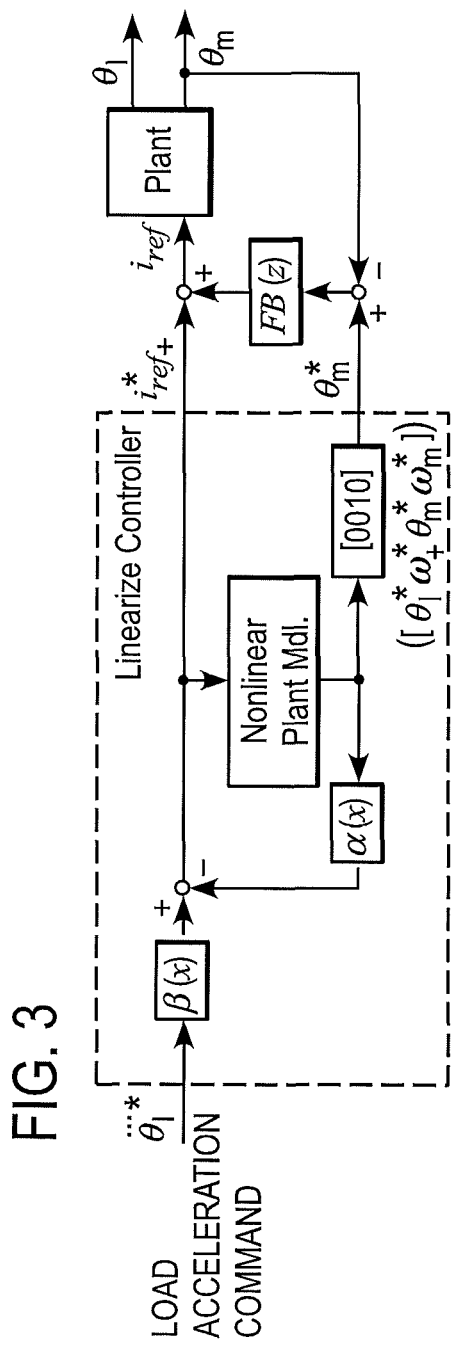
FIG. 3 is a block schematic diagram depicting the feed-forward non-linear spring compensation system according to the present invention.
Figure 4:
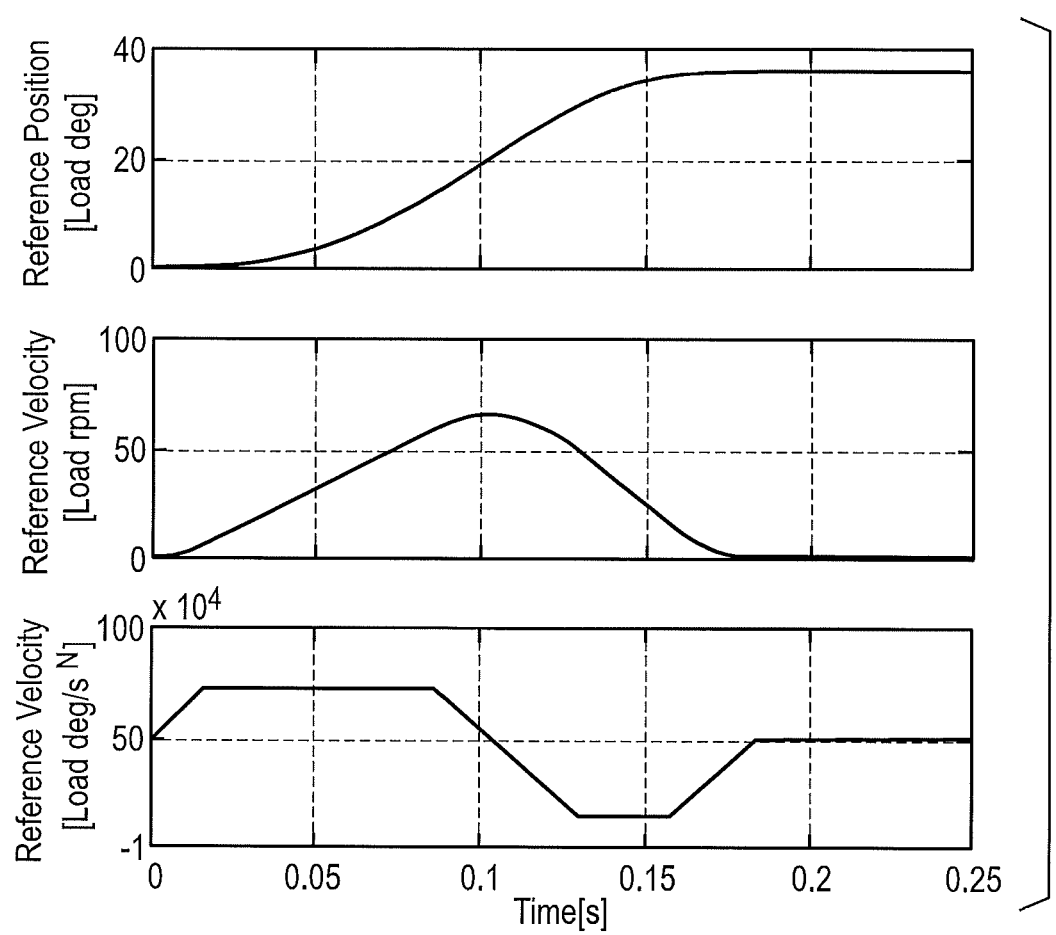
FIG. 4 is a graph depicting a command waveform employed in an experiment for confirming the non-linear spring compensation effect.
Figure 5A:
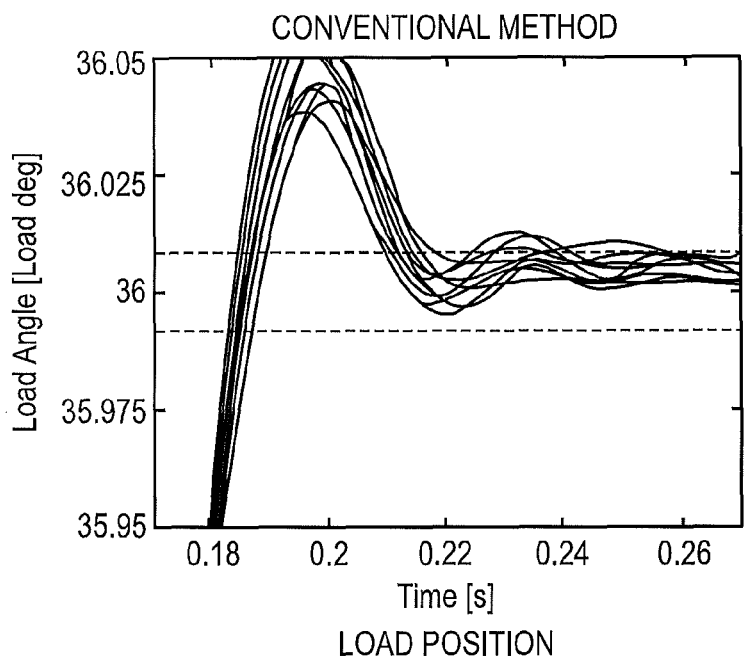
FIG. 5 is a graph depicting positioning response in an experiment for confirming the non-linear spring compensation effect.
Figure 5B:
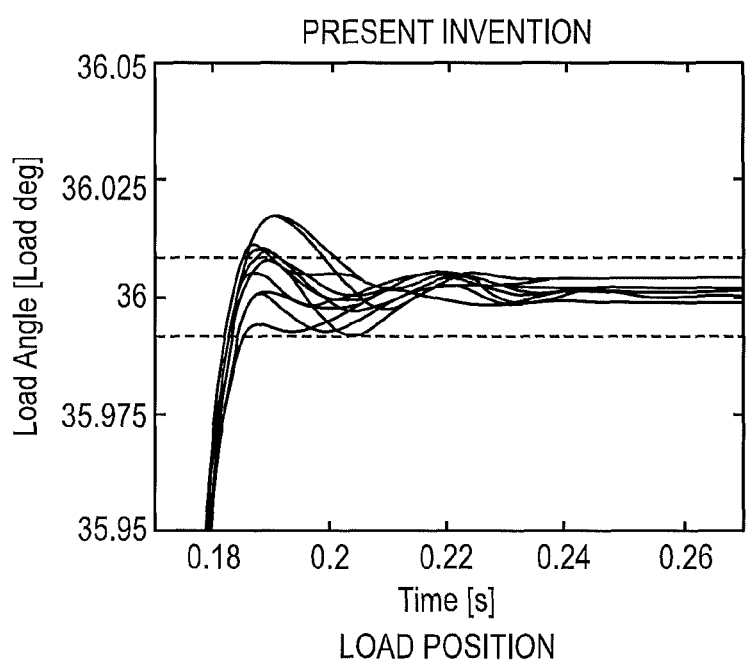
Figure 6A:
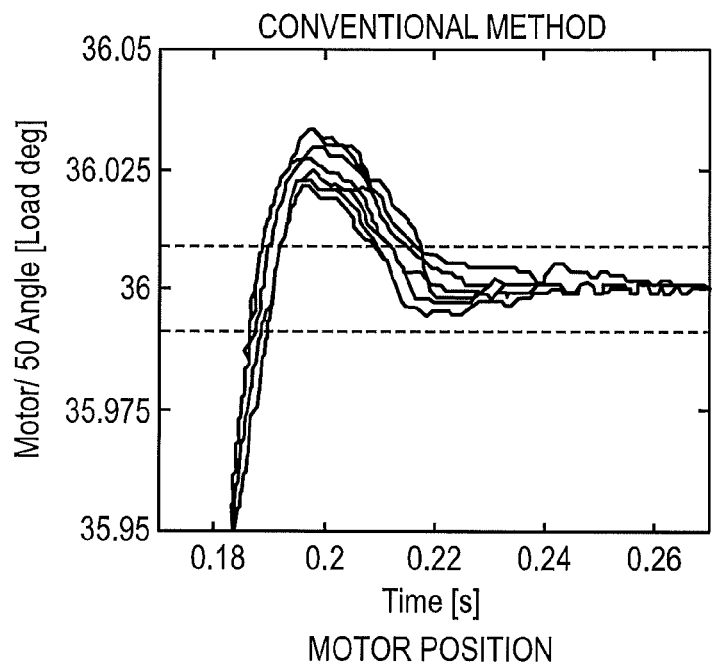
FIG. 6 is a graph depicting positioning response in an experiment for confirming the non-linear spring compensation effect.
Figure 6B:
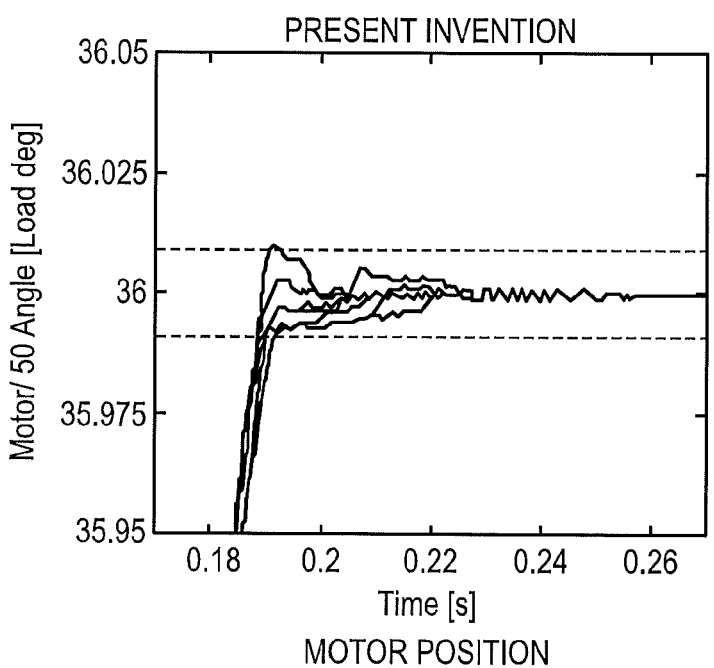
Figure 7A:
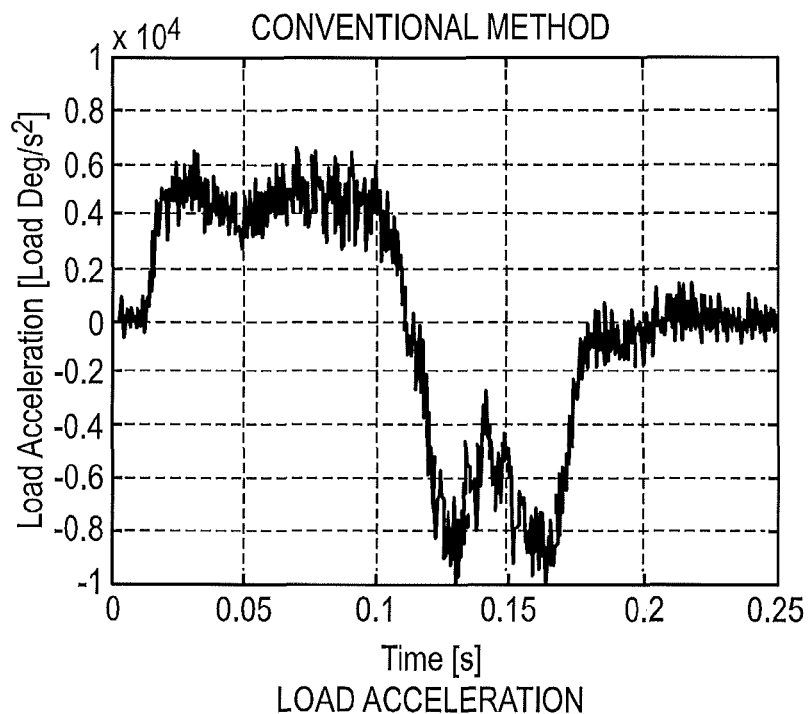
FIG. 7 is a graph depicting positioning response in an experiment for confirming the non-linear spring compensation effect.
Figure 7B:
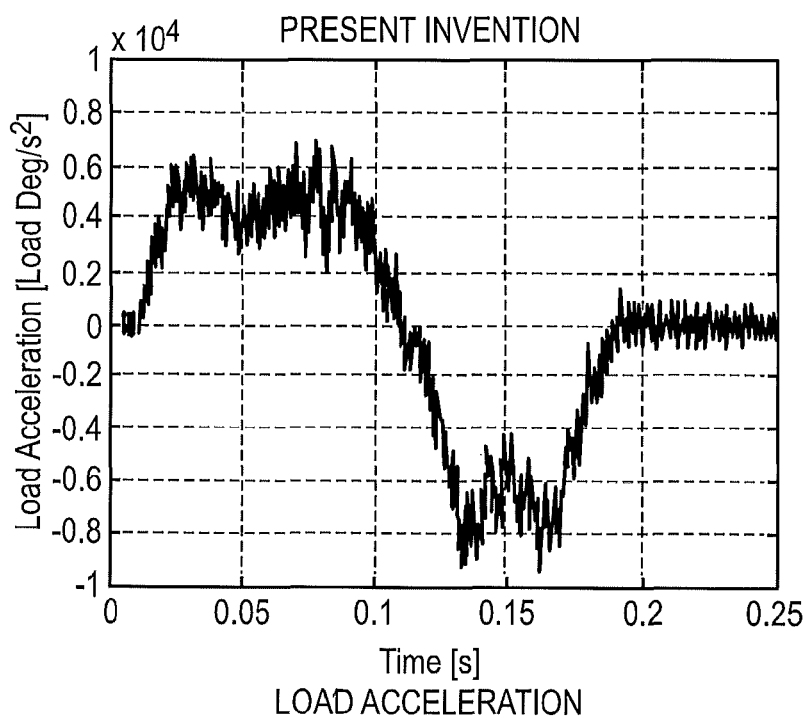
Figure 8A:
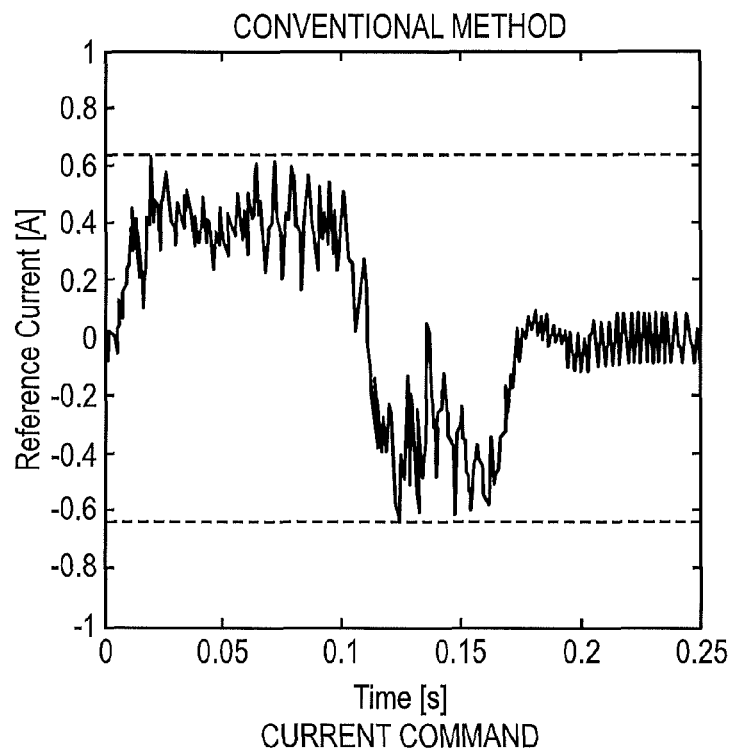
FIG. 8 is a graph depicting positioning response in an experiment for confirming the non-linear spring compensation effect.
Figure 8B:
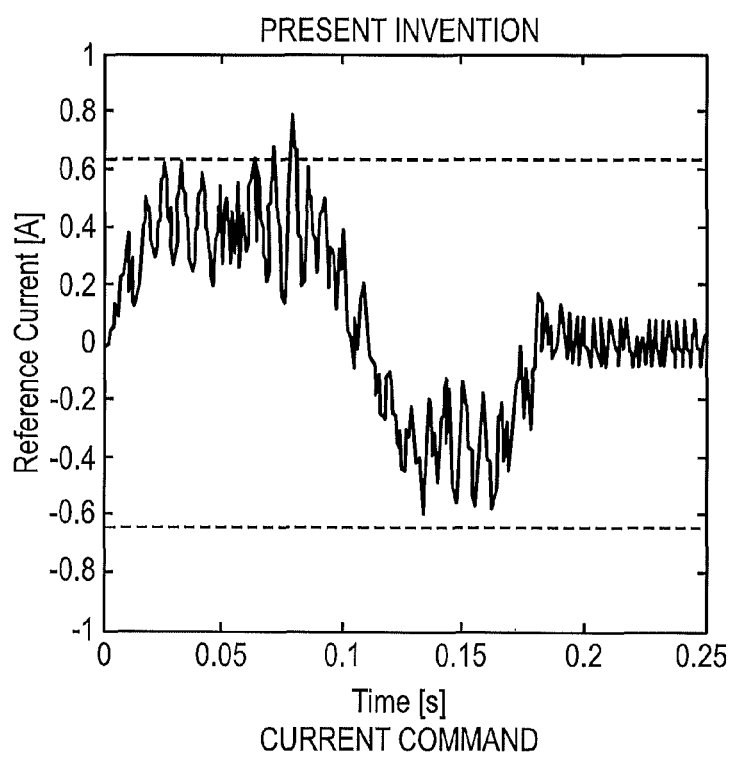

As shown in FIG. 3, the entire block-line diagram shown in FIG. 1 is installed in the controller, and the current input i*$_{ref}$ and the motor position θ*m of the plant model are inputted respectively as the FF current command and the FF motor position command when the load acceleration command is set as the command value. As long as the characteristics of the plant model and the characteristics of the device are similar, the device will thereby operate similarly to the linearized plant model; and the non-linear spring characteristics can be compensated for.

3. Experiment for Confirming Compensation Effect

The feed-forward non-linear spring compensation method described above was incorporated in a controller of an actuator in the device, and the associated compensation effect was confirmed in a positioning experiment. The conditions of the experiment are shown in Table 1. In the 2-degrees-of-freedom control system based on the coprime factorization description according to the conventional method, the linear spring model (line III) of FIG. 2 was used, and a command in the form of the trapezoidal acceleration shown in FIG. 3 and transmitted by a lowpass filter was used in both the conventional method and the method according to the present invention.

TABLE 1

Conditions for the experiment for confirming
FF non-linear spring compensation effect

|  | Conventional method | Proposed method |
|---|---|---|
| Control system | 2-degrees-of-freedom control system | FF non-linear spring compensation + P-PI control system |
| Load inertia ratio | 2.95 | |
| Target position [Load deg] | 36, 43.2, 43.56 | |
| Command | Motor position | Load acceleration |

The positioning response obtained for twelve consecutive runs of the load shaft at 36 load deg are shown in FIGS. 5 through 8. In each of the drawings, (a) shows the response results of the conventional method, and (b) shows the response results of the method according to the present invention. The horizontal broken lines are a load shaft stabilization range of ±30 load arc sec, a motor stabilization range of ±10 motor pulses, and a maximum current rating of ±0.64 A. As can be seen from the load position and motor position response in FIGS. 5 and 6, while there is an overshoot of approximately 0.05 load deg and 0.025 load deg in both the load shaft and the motor shaft, the overshoot is reduced in the method according to the present invention to approximately 0.02 load deg in the load shaft and 0.01 load deg in the motor shaft.

CONCLUSION

As described above, a feed-forward non-linear spring compensation system based on an exact linearization technique was constructed as a non-linear characteristic compensation method in a wave gear device in regard to a non-linear spring characteristic between the input and output shafts of the wave gear device, and the compensation effects were confirmed by experimentation on an actual device. The results confirmed that the overshoot of the load shaft can be reduced and smooth stabilization achieved by performing the non-linear spring compensation based on the exact linearization technique.

What is claimed is:

1. A method for controlling by a processor, positioning of an actuator which reduces a rotational output of a motor via a wave gear device and transmitting the output from a load shaft, and controlling positioning of the load shaft based on a rotational position and speed of a motor shaft of the motor, the processor arranged to:

perform non-linear spring compensation for inhibiting a reduction in the accuracy with which positioning of the load shaft is controlled, as caused by non-linear elastic deformation in relation to a load torque of the wave gear device; and in the non-linear spring compensation, construct a plant model that has been linearized using an exact linearization technique from the actuator to be controlled, and defining the linearization feedback $\alpha(x)$ and input conversion $\beta(x)$ as well as the characteristics of the expansion system from input v to output y according to formulae (A), (B), and (C), respectively;

[FORMULA A]

$$\alpha(x) \cdot x = -\frac{J_m J_l N}{D_g K_t} \left\{ \frac{1}{J_l} \frac{d}{dt} \tau_g(\theta_{tw}) - \left( \frac{D_l + D_g}{J_l^2} + \frac{D_g}{J_m J_l N^2} \right) \tau_g(\theta_{tw}) + \left( \frac{(D_l + D_g)^2}{J_l^2} + \frac{D_g^2}{J_m J_l N^2} \right) \omega_l - \left( \frac{D_l D_g + D_g^2}{J_l^2 N} + \frac{D_m D_g N^2 + D_g^2}{J_m J_l N^3} \right) \omega_m \right\} \quad (A)$$

[FORMULA B]

$$\beta(x) \cdot v = \frac{J_m J_l N}{D_g K_t} v \quad (B)$$

[FORMULA C]

$$\frac{d^3 y}{dt^3} = v \quad (C)$$

measure the non-linear elastic deformation in relation to the load torque of the wave gear device;

define the non-linear spring model $\tau g(\theta tw)$ using a cubic polynomial as shown in formula (D), with the constant defined as zero, to be able to recreate the measurement results; and

[FORMULA D]

$$\tau_g(\theta_{tw}) = K_{g3} \theta_{tw}^3 + K_{g2} \theta^2 + K_{g1} \theta_{tw} \quad (D)$$

respectively input into the processor arranged as a semi-closed loop control system for controlling the positioning of the load shaft, as a feed-forward current command and a feed-forward motor position command, the current input into the plant model and the motor position of the plant model when a load acceleration command is a command value.

* * * * *